Patented Jan. 12, 1954

2,666,086

UNITED STATES PATENT OFFICE 2,666,086

PREPARATION OF IRON DEHYDROGENATION CATALYSTS

Emory W. Pitzer, Bartlesville, Okla., assignor to Phillips Petroleum Company, a corporation of Delaware No Drawing. Application November 14, 1949, Serial No. 127,270

19 Claims. (Cl. 260—680)

This invention relates to the manufacture of improved dehydrogenation catalysts of the iron oxide-chromium oxide-potassium oxide type and to improved dehydrogenation processes effected in contact therewith. A specific aspect of the invention pertains to the manufacture of catalysts from spent catalysts of the iron oxide-chromium oxide-potassium oxide type which have similar composition to the spent catalyst.

Commercial use of iron catalyst of the iron oxide-chromium oxide-potassium oxide type has recently been made in the dehydrogenation of olefins to diolefins in the presence of steam. These catalysts have been found to be much superior to alumina-chromia type catalyst which have been used in the past in the dehydrogenation of olefins. The superiority of this type of iron catalyst is due in a large part to the fact that it is self-regenerative during use and remains relatively free of carbon probably because of the presence of potassium oxide which catalyzes the water-gas reaction between the steam and carbon. Even though these iron type catalysts are superior to the alumina-chromia type catalysts, they are not as active as might be desired and after continued use over an extended period such as a year they require replacement with new catalyst.

The principal object of this invention is to provide a method of manufacturing catalyst of the iron oxide-chromium oxide-potassium oxide type having improved activity. Another object of the invention is to provide a method of manufacturing this type catalyst from spent or deactivated catalyst of the same type. It is also an object of the invention to provide an improved process for the dehydrogenation of dehydrogenatable hydrocarbons, particularly olefins to diolefins. Other objects of the invention will become apparent from a consideration of the accompanying disclosure.

I have found a method of manufacturing iron catalyst of the type described which produces more active catalyst for the dehydrogenation of hydrocarbons, such as olefins, than any iron type catalyst heretofore known. This method is not only applicable to the manufacture of iron type catalyst from new raw materials but is also applicable to the manufacture of such catalyst from deactivated catalyst of the same type. In brief, the method comprises digesting suitable raw materials in nitric acid and/or ammonium nitrate for an extended period, evaporating the mixture to dryness, heating to remove any nitrates present and form a hard catalyst residue, comminuting the residue, and where the catalyst is to be used in pill form, pilling or pelleting the comminuted catalyst into desired form with the aid of a binder-lubricant.

The catalyst of the invention consists essentially of a major proportion of iron oxide, a minor proportion of a dehydrogenating metal oxide of the group Cr, Mo, W, U, and V, and a minor amount of potassium oxide. A preferred composition for the catalyst is 70 to 97% $Fe_2O_3$, 2 to 29% $Cr_2O_3$ (or other dehydrogenating metal oxide) and 1 to 15% $K_2O$. In preparing a catalyst it is not essential to use raw materials in the form of the oxides since any of the compounds of these metals which are converted to the oxide during the digestion and calcination steps are suitable raw materials for the process and catalyst. Examples of suitable compounds are the carbonates, hydroxides, nitrates, etc.

The selected raw materials in desired proportions are intimately mixed preferably in comminuted form and digested for a period of at least an hour and preferably 20 hours up to 100 hours or more in nitric acid, ammonium nitrate, or a mixture of the two agents. The amount of digesting agent preferred based upon 100% acid and solid ammonium nitrate is equal to at least half the weight of the catalyst raw material and may be four or five times this weight. Where both agents are used, it is preferred that the digesting mixture contain at least 5 weight per cent of the lesser constituent based upon the weight of the solid catalyst raw material and a total amount of the two agents equal to at least half the weight of the catalyst. In every case sufficient liquid should be present to provide excess liquid over that absorbed by the catalyst materials.

The acid strength in the digestion mixture may range from 10 to 100%, but a concentration of at least 25% is preferred. Apparently an acid concentration of 70% produces the best catalyst. In cases where $NH_4NO_3$ is utilized alone as the digestive agent, sufficient liquid is usually provided by merely melting the nitrate, however, additional water may be added to assure excess liquid for the extended digestion perio. Digestion under total reflux is the most feasible manner of conducting the digestion, but it is also feasible to boil the digestion mixture containing the catalyst raw material without reflux, by adding additional liquid and/or digestion agents periodically in order to maintain a suitable amount of liquid in the digestion mixture.

At the end of the digestion period the mixture of catalyst raw material and liquid is evaporated to dryness in any suitable manner, preferably by continued heating so as to produce a dry residue and decompose the $NH_4NO_3$. This dry residue is then calcined, preferably in the presence of an oxygen-containing atmosphere at a temperature in the range of 500 to 1100° F. for a minimum period of 5 hours and up to 100 hours or more so as to convert the constituents to the oxides and activate the catalytic material. A preferred calcination temperature lies in the range of 700 to 800° F.

When deactivated or spent catalysts are reactivated according to the method of the invention the spent catalyst is preferably comminuted and treated in the same manner as described for the preparation of catalyst from unused raw materials. Since it is desired in some instances to change the proportions of constituents in the new or reactivated catalyst from those in the deactivated catalyst, it is feasible to add new raw materials, such as potassium hydroxide where it is desired to increase the potassia content, or chromium trioxide where it is desired to increase the chromia content, etc. The iron content of the catalyst may likewise be increased by the addition of suitable iron compounds.

An acceptable and satisfactory explanation of the mechanism of the catalyst reactivation has not been developed. That the process does not require the dissolution of any appreciable quantity of the deactivated catalyst is pretty well established. It is also apparent that where the raw materials are such that dissolution does occur this is not fundamental to the preparation of active catalyst. To illustrate, the chromium in a deactivated catalyst is largely in the form $Cr_2O_3$ which is only slightly soluble in nitric acid, yet the deactivated catalyst is completely restored to its original activity, at least, by the method of the invention. The same is true also when utilizing unused $Cr_2O_3$ for the starting chromium raw material. Likewise, iron in the form of $Fe_3O_4$ (magnetic oxide) when formed by combustion of iron at high temperature is insoluble in nitric acid but this compound is a suitable raw material for the process. A substantial portion of the iron in the deactivated catalyst is in the form of $Fe_3O_4$.

Catalysts of the invention are effective in dehydrogenating all types of dehydrogenatable hydrocarbons and particularly those which are dehydrogenated to advantage in the presence of steam. Their greatest utility, however, is in the dehydrogenation of olefins of 2 to 8 carbon atoms per molecule. In such processes the conditions of the dehydrogenation, viz., temperature, pressure, contact time, and space velocity, as well as steam content of the feed, are those commonly used in the art and are not per se a part of the invention.

The following examples provide a more complete understanding of the invention.

EXAMPLE I

*Preparation of catalyst A*

A catalyst hereinafter designated Catalyst D containing 93% $Fe_2O_3$, 5% $Cr_2O_3$, and 2% $K_2O$ (weight per cents) deactivated by continuous use for 348 days in the dehydrogenation of butenes to butadiene in the presence of steam from an original activity of 25.68% to 23.93% (yield) was reactivated by (1) comminuting the catalyst, (2) boiling the powdered spent catalyst in a digestion mixture consisting of two weights of 70% nitric acid and one weight of ammonium nitrate (based upon the weight of the catalyst) at a temperature of 300° F. for 40 hours, (3) evaporating the mixture to dryness, (4) calcining the dry residue at a temperature of 750° F. for 24 hours, (5) comminuting the calcined catalytic material, (6) pelleting the powdered catalyst into small pills with the aid of a Sterotex binder and lubricant, and (7) calcining the pills to remove the binder and harden the pills. The original dark red color of the catalyst was restored.

EXAMPLE II

*Preparation of catalyst B*

A catalyst consisting of 93% $Fe_2O_3$, 5% $Cr_2O_3$, and 2% $K_2O$ (per cents by weight) was prepared by the following steps (1) mixing reagent grade $Fe_2O_3$, $Cr_2O_3$, and KOH in the proper amounts to give the composition described, (2) digesting the mixture for 70 hours at the boiling temperature in 49% nitric acid equivalent to twice the weight of the catalyst mixture, (3) evaporating the mixture to dryness, (4) calcining the dry residue at a temperature of 750° F. for 48 hours, (5) comminuting and pilling the catalyst with the aid of a Sterotex binder-lubricant, and (6) heating the pills at 1000° F. for 21 hours to remove the binder.

In order to compare the activity of catalysts A and B with commercial iron catalyst of similar composition, these catalysts were used in the dehydrogenation of a butene-2 stream mixed with steam under similar reaction conditions along with catalysts C and D. Catalyst C had the composition 93% $Fe_2O_3$, 5% $Cr_2O_3$, and 2% $K_2O$, and represents the best available commercial catalyst of its type. However, the method of preparation of this catalyst is unavailable and therefore cannot be described. Catalyst D is deactivated catalyst C after partial deactivation from continuous use in the dehydrogenation of butenes for 348 days without off-stream regeneration. The initial activity of catalyst D (new catalyst C) was 25.68% (yield) and the activity after 348 days' use was 23.93%.

The results obtained in the dehydrogenation processes utilizing catalysts A, B, C, and D and the conditions of reaction are shown in the following table.

| Catalyst | Temp., °F. | Cat. age, days | Hyc SV (STP) | Steam: Hyc ratio (STP) | Mol percent of feed | | |
|---|---|---|---|---|---|---|---|
| | | | | | Conv. | Yield [1] | Eff. |
| A (React.) | 1,135 | <1 | 267 | 13.2 | 44.52 | 28.59 | 64.22 |
| B (New) | 1,130 | <1 | 250 | 13.7 | 40.77 | 26.18 | 67.21 |
| C (Com.) | 1,137 | <1 | 270 | 14.1 | 33.63 | 25.68 | 76.36 |
| D (Used C) | 1,162 | 348 | 265 | 13.6 | 36.13 | 23.93 | 66.23 |

[1] Yield of butadiene.

The pressure utilized in each of the dehydrogenation runs was 7 mm. of mercury.

It can readily be seen from the data that catalyst A, prepared by reactivating catalyst D, has higher activity than catalyst C and that the method of the invention more than restores the original activity of this catalyst. It should also be noted that the activity of catalyst B as represented by the yield of butadiene is also greater than the activity of catalyst C. Catalyst B was prepared from suitable raw materials by digestion in nitric acid alone. The activity of this catalyst is less than the activity of catalyst A which was prepared by digesting the deactivated catalyst raw material in a mixture incorporating both nitric acid and ammonium nitrate as the digestion agents. Iron catalyst of this type prepared from unused raw materials which have been digested in both ammonium nitrate and nitric acid have enhanced activity over catalyst prepared by digesting the raw materials in only one of the digestion agents.

While the efficiency of catalysts A and B is less than the efficiency of catalyst C, it is apparent that if the temperature and space velocity for these runs are adjusted so as to effect conversion similar to that for catalysts C the ultimate yield and efficiency of these catalysts (A and B) will be appreciably higher than that of commercial catalyst C.

In preparing or reactivating catalysts of the same composition as those of Examples I and II by digesting in ammonium nitrate alone, the activity of the resulting catalyst is approximately the same as the activity of catalyst B. It can therefore be seen that the preparation of iron oxide-dehydrogenating metal oxide-potassium oxide catalyst by digestion of the raw materials in either nitric acid or ammonium nitrate produces catalysts of enhanced activity as compared with the best available commercial catalyst and that the use of both nitric acid and ammonium nitrate in the digestion mixture produces even superior catalysts to those produced by digestion in either agent alone.

Certain modifications of the invention will become apparent to those skilled in the art and the illustrative details disclosed are not to be construed as imposing unnecessary limitations on the invention.

I claim:

1. A process for preparing catalytic material for dehydrogenation of dehydrogenatable hydrocarbons which comprises forming an intimate finely divided mixture of a compound of iron, a compound of at least one metal selected from the group consisting of chromium, molybdenum, tungsten, uranium, and vanadium, and a compound of potassium, each of said compounds being selected from the group consisting of the oxides and compounds converted to the oxides by the hereinafter recited digesting and calcining steps; digesting said mixture with at least one member of the group consisting of nitric acid and ammonium nitrate in a minimum amount equal to one-half the weight of said mixture for a minimum period of one hour in the presence of excess liquid; evaporating the digested mixture to dryness; calcining the residue at a temperature in the range of 500 to 1100° F. so as to drive off any remaining volatile materials; and comminuting the calcined residue.

2. The process of claim 1 in which the selected metal compound is an oxide of chromium.

3. The process of claim 1 in which the selected metal compound is an oxide of molybdenum.

4. The process of claim 1 in which the selected metal compound is an oxide of vanadium.

5. The process of claim 1 in which the digesting medium is nitric acid.

6. The process of claim 1 in which the digesting medium is ammonium nitrate.

7. The process of claim 1 in which the digesting medium comprises a mixture of nitric acid and ammonium nitrate.

8. The process of claim 1 in which the selected metal compound is an oxide of chromium and the digesting medium is nitric acid.

9. The process of claim 1 in which the selected metal compound is an oxide of chromium and the digesting medium is ammonium nitrate.

10. The process of claim 1 in which the selected metal compound is an oxide of chromium and the digesting medium comprises a mixture of nitric acid and ammonium nitrate.

11. A process for preparing catalytic material for the dehydrogenation of dehydrogenatable hydrocarbons which comprises forming an intimate finely-divided mixture of an oxide of iron, an oxide of chromium, and potassium hydroxide in which the iron is in major proportion; digesting said mixture in 25-100 per cent nitric acid in amount which provides excess liquid in the mixture for a minimum period of 20 hours; evaporating the digested mixture to dryness, calcining the residue at a temperature in the range of 500 to 1100° F. for a minimum period of 5 hours; comminuting the calcined residue; pelleting the comminuted material with the aid of a combustible lubricant-binder; and burning out the binder to produce rigid pellets.

12. The process of claim 1 in which the catalyst raw materials are obtained by comminuting a dehydrogenation catalyst deactivated by extended use in the dehydrogenation of a hydrocarbon stream and containing principally iron oxide, at least one oxide selected from the group consisting of the oxides of chromium, molybdenum, tungsten, uranium, and vanadium, and potassium oxide.

13. A process for reactivating a partially deactivated dehydrogenation catalyst containing principally iron oxide, chromium oxide, and potassium oxide which comprises comminuting said catalyst; digesting the comminuted catalyst with at least an equal weight of at least one member of the group consisting of nitric acid and ammonium nitrate for a minimum period of one hour in the presence of excess liquid; evaporating the digested mixture to dryness; calcining the dry residue at a temperature in the range of 500 to 1100° F. so as to drive off the remaining volatile constitutents; and comminuting the calcined residue.

14. A dehydrogenation catalyst made by the process of claim 1 in which the iron compound is a major proportion of said mixture, the compound of at least one metal selected from the group consisting of chromium, molybdenum, tungsten, uranium, and vanadium is a minor proportion up to a total of 47 weight per cent, and the potassium compound is in the range of 1 to 15 weight per cent.

15. A dehydrogenation catalyst made by the process of claim 11 in which the iron oxide is in the range of 70 to 97 weight per cent, the chromium oxide is in the range of 2 to 27 weight per cent, and the potassium hydroxide is in the range of 1 to 15 weight per cent.

16. A dehydrogenation catalyst prepared from a mixture consisting essentially of iron oxide in major proportion, chromium oxide in the range of 2 to 47 weight per cent, and potassium oxide in the range of 1 to 15 weight per cent, by the process of claim 13.

17. In a process for dehydrogenating a dehydrogenatable hydrocarbon to a less saturated hydrocarbon comprising contacting said dehydrogenatable hydrocarbon under dehydrogenating conditions with a catalyst consisting essentially of an intimate mixture of iron oxide, at least one metal oxide selected from the class consisting of the oxides of chromium, molybdenum, tungsten, uranium, and vanadium, and potassium oxide, the improvement comprising effecting said contacting in the presence of the catalyst of claim 14.

18. In a process for dehydrogenating a dehydrogenatable hydrocarbon to a less saturated hydrocarbon comprising contacting said dehydrogenatable hydrocarbon under dehydrogenating conditions with the catalyst of claim 15.

19. In a process for dehydrogenating a butene to butadiene comprising contacting butene in admixture with steam under dehydrogenating conditions with a catalyst consisting essentially of an intimate mixture of iron oxide, chromium oxide, and potassium oxide so as to produce butadiene, the improvement comprising effecting said contacting in the presence of the catalyst of claim 15.

EMORY W. PITZER.

References Cited in the file of this patent

UNITED STATES PATENTS

| Number | Name | Date |
| --- | --- | --- |
| 2,364,562 | Stowe | Dec. 5, 1944 |
| 2,426,829 | Kearby | Sept. 2, 1947 |
| 2,436,600 | Reeves | Feb. 24, 1948 |